(12) United States Patent
Dudar

(10) Patent No.: US 10,598,071 B2
(45) Date of Patent: Mar. 24, 2020

(54) METHODS AND SYSTEM FOR DIAGNOSING A PARTICULATE FILTER SENSOR

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 15/647,723

(22) Filed: Jul. 12, 2017

(65) Prior Publication Data

US 2019/0017427 A1 Jan. 17, 2019

(51) Int. Cl.
| | |
|---|---|
| *F01N 11/00* | (2006.01) |
| *F02D 41/14* | (2006.01) |
| *F02D 41/22* | (2006.01) |
| *F02D 13/02* | (2006.01) |
| *F02D 41/04* | (2006.01) |
| *F02D 29/02* | (2006.01) |
| *F01N 9/00* | (2006.01) |
| *F01N 3/023* | (2006.01) |

(Continued)

(52) U.S. Cl.
CPC .............. *F01N 11/00* (2013.01); *F01N 3/023* (2013.01); *F01N 9/00* (2013.01); *F01N 11/002* (2013.01); *F02D 13/0215* (2013.01); *F02D 29/02* (2013.01); *F02D 41/042* (2013.01); *F02D 41/1444* (2013.01); *F02D 41/1448* (2013.01); *F02D 41/22* (2013.01); *F02D 41/222* (2013.01); *F01N 2550/00* (2013.01); *F01N 2550/04* (2013.01); *F01N 2560/05* (2013.01); *F01N 2560/08* (2013.01); *F01N 2900/0416* (2013.01); *F02D 41/029* (2013.01); *F02D 2041/001* (2013.01); *F02D 2041/223* (2013.01); *F02D 2200/0812* (2013.01); *F02D 2250/06* (2013.01); *F02D 2250/24* (2013.01)

(58) Field of Classification Search
CPC ................. F01N 11/00; F01N 2560/08; F01N 2900/0416; F01N 11/002; F01N 9/00; F01N 3/023; F01N 2550/04; F01N 2550/00; F01N 2560/05; F02D 41/222; F02D 41/1448; F02D 2250/06; F02D 2041/223; F02D 13/0215; F02D 41/042; F02D 29/02; F02D 41/1444; F02D 2250/24; F02D 41/029; F02D 2200/0812; F02D 2041/001

See application file for complete search history.

(56) References Cited

U.S. PATENT DOCUMENTS

2004/0226530 A1* 11/2004 Kojima ................. F02D 41/006
123/179.3
2008/0202096 A1* 8/2008 Driscoll ................ F01N 3/0253
60/274

(Continued)

*Primary Examiner* — Eric S. McCall
*Assistant Examiner* — Timothy P Graves
(74) *Attorney, Agent, or Firm* — Geoffrey Brumbaugh; McCoy Russell LLP

(57) ABSTRACT

Systems and methods for diagnosing operation of a sensor of an exhaust system are presented. In one example, the systems and methods may diagnose operation of the sensor when an engine is combusting air and fuel. Further, operation of the sensor may be diagnosed when the engine is not combusting air and fuel so that vehicle occupants may not be disturbed by the diagnostic.

20 Claims, 7 Drawing Sheets

(51) Int. Cl.
*F02D 41/00* (2006.01)
*F02D 41/02* (2006.01)

(56) References Cited

U.S. PATENT DOCUMENTS

| | | | |
|---|---|---|---|
| 2011/0072796 A1* | 3/2011 | Van Nieuwstadt | ... F01N 3/0238 60/285 |
| 2012/0291629 A1 | 11/2012 | Tylutki et al. | |
| 2013/0327018 A1* | 12/2013 | Tylutki | .................... F01N 11/00 60/274 |
| 2016/0341142 A1* | 11/2016 | Taibi | ....................... F01N 3/021 |

* cited by examiner

METHODS AND SYSTEM FOR DIAGNOSING A PARTICULATE FILTER SENSOR

FIELD

The present description relates to methods and a system for determining the presence or absence of degradation of a differential pressure sensor that senses a pressure change across a gasoline particulate filter. The methods and systems may be particularly useful for direct fuel injection engines that may operate from time to time in a stratified charge mode.

BACKGROUND AND SUMMARY

A gasoline or petrol spark ignited engine may include direct fuel injection. Fuel may be directly injected into an engine cylinder so that evaporation of the injected fuel may cool a charge in the engine cylinder. By cooling the cylinder charge, the engine may be operated at higher loads before engine knock occurs as compared to a port fuel injected engine. As such, the engine may operate more efficiently and may provide more power than a port fuel injected engine. However, directly injecting fuel into a cylinder may also provide an opportunity for injected fuel to stratify within an engine cylinder leading to carbonaceous exhaust. The carbonaceous exhaust may be stored in a particulate filter where it may be subsequently oxidized so that less particulate matter may be exhausted to atmosphere. Over time, the particulate filter may fill with carbonaceous soot such that the particulate filter may need to be regenerated. One way to determine whether or not the particulate filter is storing more than a threshold amount of carbonaceous soot is to measure a pressure change or pressure differential across the particulate filter. If the particulate filter is loaded with carbonaceous soot, a higher pressure differential may be indicated when engine air flow is high. However, it may be possible for a hose of a differential pressure sensor to detach from its anchored position due to maintenance or unforeseen circumstance. If the differential pressure sensor's hose becomes detached, it may be difficult to determine whether or not the differential pressure sensor is providing reliable information. Therefore, it may be desirable to provide a way of ascertaining whether or not differential pressure sensor data is reliable.

The inventor herein has recognized the above-mentioned issue and has developed a vehicle operating method, comprising: in response to an exhaust system sensor diagnostic request, rotating an engine in a reverse direction without fueling the engine; receiving data from a differential pressure sensor to a controller while rotating the engine in the reverse direction; and adjusting engine operation via the controller in response to the data from the differential pressure sensor.

By rotating an engine in reverse when the engine is not combusting air and fuel, it may be possible to provide the technical result of greater flow through an engine than if the engine were rotating in a forward direction when the engine is not combusting air and fuel so that a signal to noise ratio of exhaust sensor output may be improved. Further, by rotating the engine without combustion, an exhaust sensor diagnostic may be performed when there are no vehicle occupants so that the diagnostic may be less detectable. Further still, exhaust sensor diagnostics may be selectively performed during engine operation at times when they may be less likely to be detected.

The present description may provide several advantages. For example, the approach may allow for improved sensor diagnostics. In addition, the approach may provide diagnostics while the engine is operating or not operating so that an exhaust sensor may be diagnosed in a timely manner. Additionally, the approach may provide an improved signal to noise ratio for exhaust sensor output.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
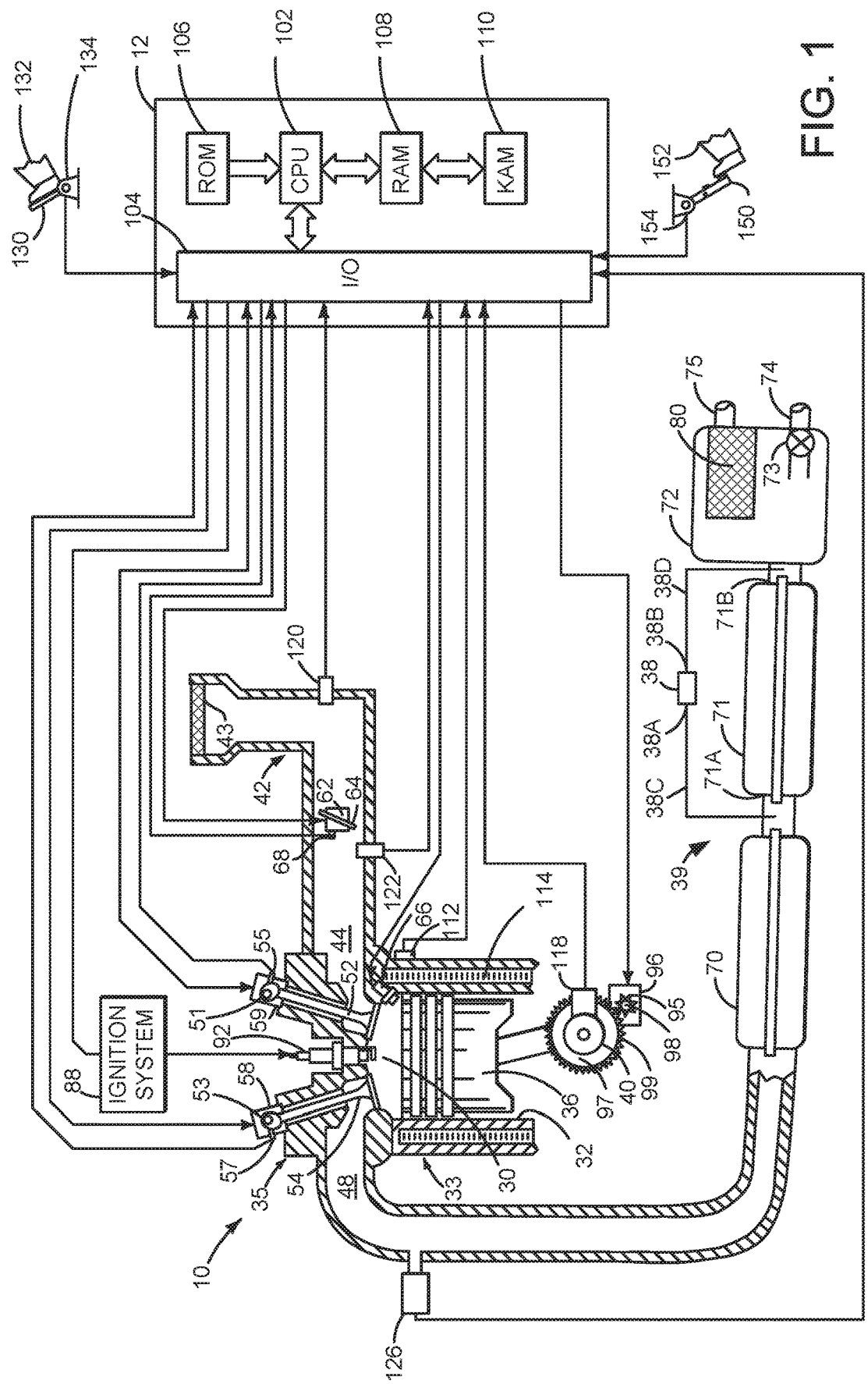
FIG. 1 is a schematic diagram of an engine.
Figure 2:
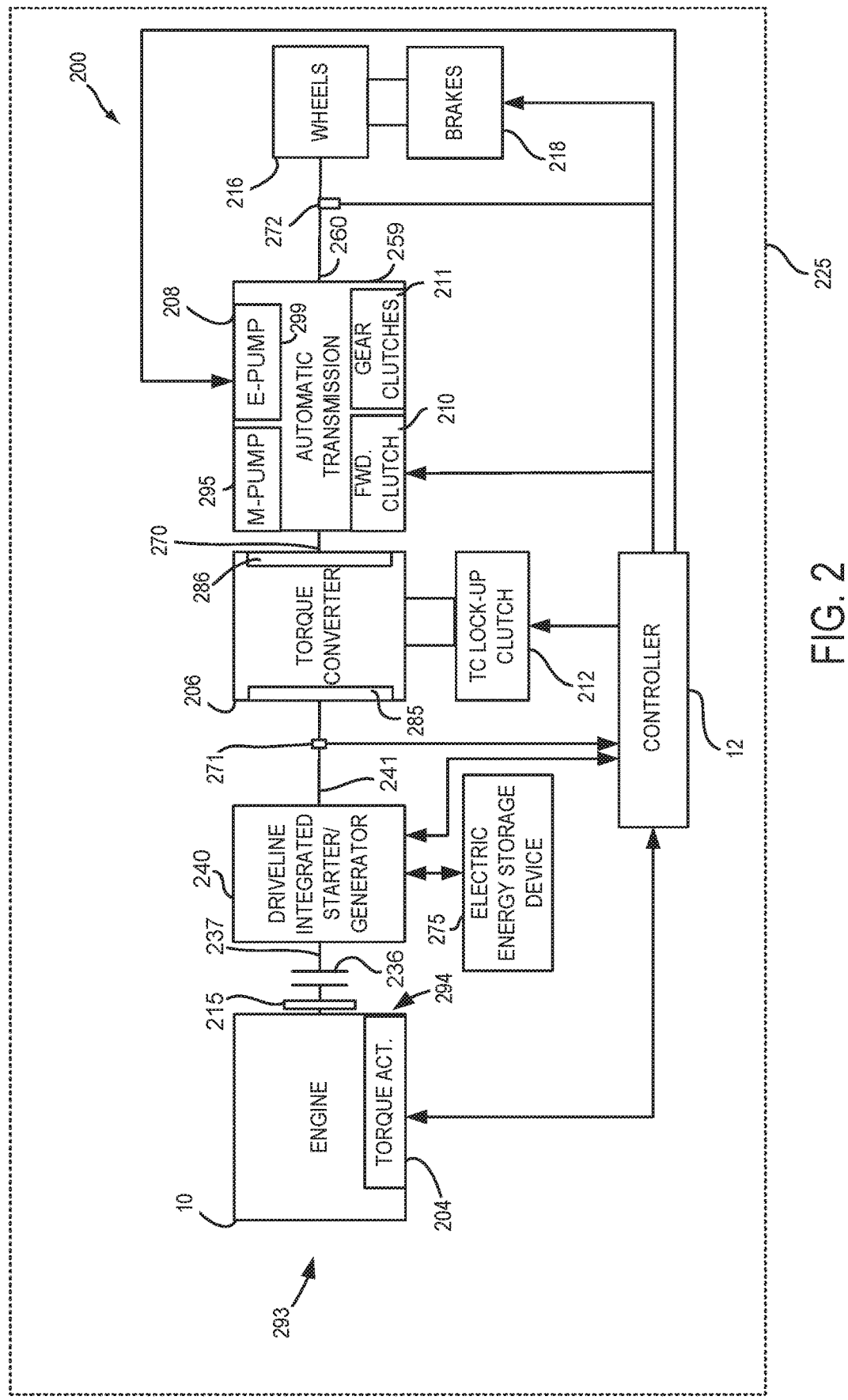
FIG. 2 is a schematic diagram of a hybrid vehicle driveline including the engine of FIG. 1.
Figure 3A:
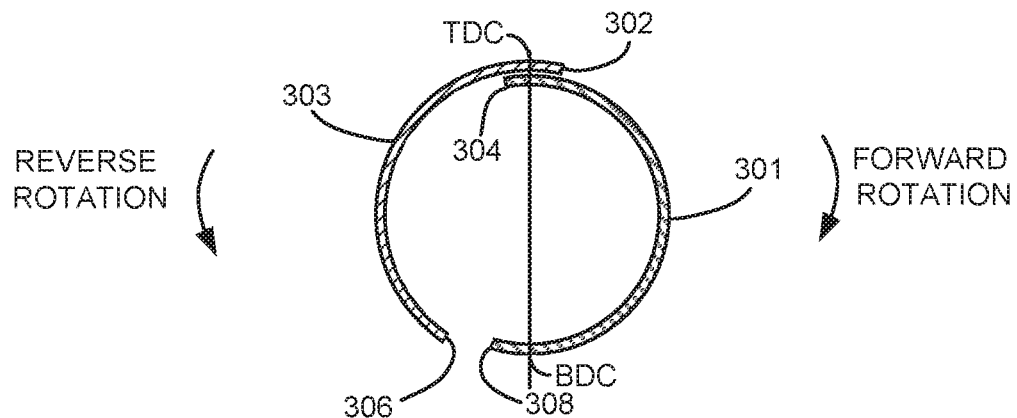
FIGS. 3A and 3B show example engine valve timing.
Figure 3B:
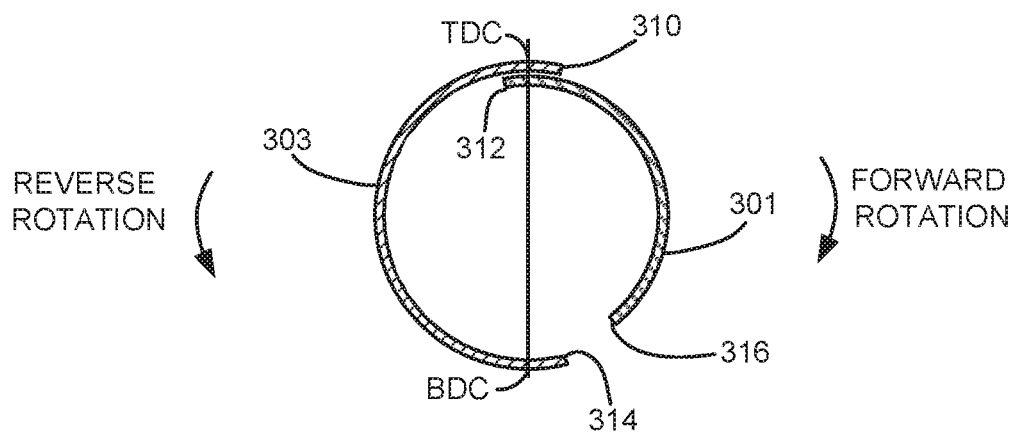
Figure 4:
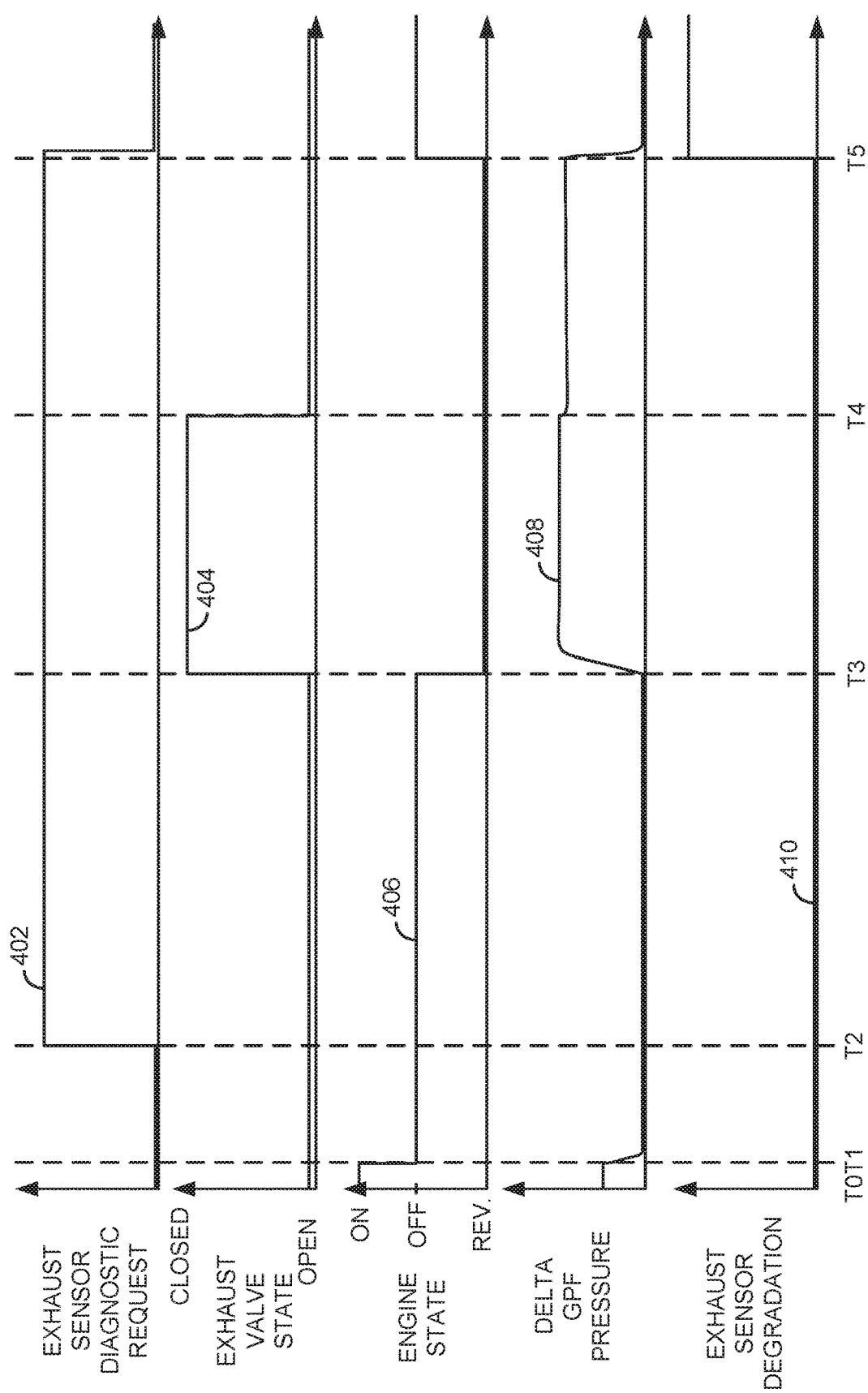
FIG. 4 is plot that illustrates vehicle operation during exhaust sensor diagnostics according to the method of FIGS. 5A-5C.

The present description is related to diagnosing operation of a differential pressure sensor that senses pressure on opposite sides of a particulate filter. The particulate filter may be incorporated into a vehicle with a spark ignited engine as is shown in FIG. 1. The engine may be part of a hybrid vehicle as shown in FIG. 2. The engine may also have intake and exhaust valve timing that provides for higher flow through the engine when the engine is rotated in a reverse direction as illustrated in FIGS. 3A and 3B. The vehicle may operate as shown in FIG. 4 according to the method of FIGS. 5A-5C.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. Starter 96 may rotate engine 10 in a forward or reverse direction. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example. Exhaust flows in a direction from exhaust valve 54 to muffler 72 when engine 10 is rotating in a forward direction combusting air and fuel. Particulate filter 71 is located downstream of converter 70 according to the direction of exhaust flow. Differential pressure sensor 38 senses a pressure difference from front 71A to rear 71B of particulate filter 71. In particular, upstream port 38A senses pressure upstream of particulate filter 71 via hose 38C and downstream port 38B senses pressure downstream of particulate filter 71 via hose 38D according to the direction of exhaust flow. Muffler 72 is positioned downstream of particulate filter 71 and it includes an exhaust valve 73 for selectively bypassing noise control media 80. Exhaust valve 73 allows exhaust to flow directly to atmosphere via outlet 74 when exhaust valve 73 is open. Exhaust valve 73 directs exhaust gas through noise control media 80 and outlet 75 when exhaust valve 73 is closed.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. DISG 240 may rotate the engine in a forward direction (e.g., clockwise when viewed from the front of engine 10) or a reverse direction (e.g., counter clockwise when viewed from the front of engine 10). Further, torque of engine 10 may be adjusted via torque actuator 204, such as a fuel injector, throttle, etc.

An engine output torque may be transmitted to an input side of driveline disconnect clutch 236 from rear 294 of engine 10 through dual mass flywheel 215. Disconnect clutch 236 may be electrically or hydraulically actuated. In this example, disconnect clutch 236 may be operated via fluid supplied from mechanically driven transmission fluid pump 295 or electrically driven transmission fluid pump 299. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives DISG position via position sensor 271 which also indicates the position of shaft 241 and mechanically driven transmission fluid pump 295. Controller 12 may convert transmission input shaft position into input shaft speed via differentiating a signal from position sensor 271. Controller 12 may receive transmission output shaft torque from torque sensor 272. Alternatively, sensor 272 may be a position sensor or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

The system of FIGS. 1 and 2 provides for a system, comprising: a vehicle including an engine; a motor selectively coupled to the engine; and a controller including executable instructions stored in non-transitory memory to rotate the engine in a reverse direction via the motor without combusting air and fuel in response to an exhaust sensor diagnostic request, and instructions to propel the vehicle via the motor. The system further comprises additional instructions to combust air and fuel in the engine and to rotate the engine in a forward direction. The system further comprises a particulate filter and an exhaust valve located in an exhaust system coupled to the engine, the exhaust valve located downstream of the particulate filter. The system further comprise additional instructions to open and close the exhaust valve while rotating the engine in the reverse direction. The system further comprises a differential pressure sensor configured to sense pressure on two opposite sides of the particulate filter. The system further comprises additional instructions to compare output of the differential pressure sensor when the exhaust valve is open to output of the differential pressure sensor when the exhaust valve is closed. The system further comprises additional instructions to adjust operation of the engine in response to the comparison. The system includes where the motor is an integrated starter/generator.

Referring now to FIG. 3A, example valve timings for a first engine are shown. Forward and reverse engine rotation directions are indicated by arrows. Exhaust valve open timing is represented by the outer ring 303. Intake valve open timing is represented by the inner ring 301. The valve timings are referenced to cylinder positions top-dead-center (TDC) and bottom-dead-center (BDC). The exhaust valve closing time (EVC) when the engine is rotated in a forward direction is at 302. The exhaust valve opening (EVO) time when the engine is rotated in a forward direction is at 306. The intake valve closing (IVC) time when the engine is rotated in a forward direction is at 308. The intake valve opening (IVO) time when the engine is rotated in a forward direction is at 304. If the engine is rotated in a reverse direction, EVO occurs at 302 and EVC occurs at 306. IVO occurs at 308 and IVC occurs at 304.

Thus, it may be observed that the intake valve opening duration is longer than the exhaust valve opening duration. Further, IVO is near TDC and IVC is near BDC for rotating the engine in a forward direction. EVO is after BDC and EVC is after TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. Therefore, air flow through the engine when the engine is rotated with an open intake throttle and unfueled in a forward direction may be greater than air flow through the engine when the engine is rotated with the intake throttle open and unfueled in a reverse direction at a same engine speed for this illustrated valve timing. The increased air flow through the engine while the engine is rotated at a first speed in a forward direction may be due to the longer intake valve opening duration and intake valve opening and closing timings. The decreased air flow through the engine while the engine is rotated at the first speed in a reverse direction may be due to the shorter exhaust valve opening duration and exhaust valve opening and closing timings as compared to the intake valve opening duration and the intake valve opening and closing times. Nevertheless, rotating the engine in a reverse direction with the valve timings of FIG. 3A may still be useful when diagnosing an exhaust sensor because restriction of the muffler may provide for a pressure drop across the particulate filter when the engine is rotated in a reverse direction.

Referring now to FIG. 3B, example valve timings for rotating an engine in a reverse direction (e.g., counter clockwise) with a higher flow rate when diagnosing an exhaust sensor is shown. Forward and reverse engine rotation directions are indicated by arrows. Exhaust valve open timing is represented by the outer ring 303. Intake valve open timing is represented by the inner ring 301. The valve timings are referenced to cylinder positions top-dead-center (TDC) and bottom-dead-center (BDC). The exhaust valve closing time (EVC) when the engine is rotated in a forward direction is at 310. The exhaust valve opening (EVO) time when the engine is rotated in a forward direction is at 314. The intake valve closing (IVC) time when the engine is rotated in a forward direction is at 316. The intake valve opening (IVO) time when the engine is rotated in a forward direction is at 312. If the engine is rotated in a reverse direction, EVO occurs at 310 and EVC occurs at 314. IVO occurs at 316 and IVC occurs at 312.

Thus, it may be observed that the exhaust valve opening duration is longer than the intake valve opening duration. Further, IVO is near TDC and IVC is well advanced of BDC for rotating the engine in a forward direction. EVO is near BDC and EVC is near TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. For these reasons, air flow through the engine when the engine is rotated with an open intake throttle and unfueled in a reverse direction may be greater than air flow through the engine when the engine is rotated with the intake throttle open and unfueled in a forward direction at a same engine speed. The increased air flow through the engine while the engine is rotated at a first speed in a reverse direction may be due to the longer exhaust valve opening duration and exhaust valve opening and closing timings. The decreased air flow through the engine while the engine is rotated at the first speed in a forward direction may be due to the shorter intake valve opening duration and intake valve opening and closing timings as compared to the exhaust valve opening duration and the exhaust valve opening and closing times. Thus, whether air flow through an engine while rotating the engine in a forward direction at a first speed is greater than air flow through the engine while rotating the engine in a reverse direction at the first speed may depend on intake and exhaust valve timings, including valve opening durations and valve opening and closing times. Consequently, for some engine configurations, rotating an engine in a forward direction provides more air flow through the engine for a given engine speed as compared to rotating the same engine at the same given speed in a reverse direction. On the other hand, other engines that may provide more air flow through the engine at a given engine speed when rotated in a reverse direction as compared to rotating the same engine at the same speed in the forward direction. As such, the direction of engine rotation may be selected to increase air flow through the engine so that the engine may be rotated at a lower speed when diagnosing exhaust sensors. For example, if rotating a particular engine at a desired speed in a reverse direction provides greater air flow through the engine as compared to rotating the engine at the desired speed in the forward direction, then the engine may be rotated in a reverse direction for diagnosing exhaust sensors to improve the signal to noise ratio of the exhaust sensor.

Referring now to FIG. 4, a vehicle operating sequence is shown. The vehicle operating sequence of FIG. 4 may be provided via the system of FIGS. 1 and 2. The vehicle operating sequence may also be provided based on the method of FIGS. 5A-5C.

The first plot from the top of FIG. 4 is a plot of an exhaust sensor (e.g., gasoline particulate filter (GPF) sensor) diagnostic request state versus time. The vertical axis represents exhaust sensor diagnostic state and an exhaust sensor diagnostic is requested when trace 402 is at a higher level near the vertical axis arrow. An exhaust sensor diagnostic is not requested when trace 402 is at a lower level near the horizontal axis. The horizontal axis represents time and time increases from the left side of the plot to the right side of the plot.

The second plot from the top of FIG. 4 is a plot of exhaust valve (e.g., 73 of FIG. 1) operating state versus time. The exhaust valve is open when trace 404 is at a higher level near the vertical axis arrow. The exhaust valve is closed when trace 404 is at a lower level near the horizontal axis. The horizontal axis represents time and time increases from the left side of the plot to the right side of the plot.

The third plot from the top of FIG. 4 is a plot of engine operating state versus time. The engine may rotate in a forward direction and combust air and fuel when trace 406 is at a level of "ON" along the vertical axis. The engine is stopped and not rotating when trace 406 is at a level of "OFF" along the vertical axis. The engine is rotating in a reverse direction without combusting air and fuel when trace 406 is at a level of "REV." along the vertical axis. The horizontal axis represents time and time increases from the left side of the plot to the right side of the plot.

The fourth plot from the top of FIG. 4 is a plot of differential (e.g., delta) GPF pressure versus time. The vertical axis represents differential GPF pressure output (e.g., differential pressure) of exhaust sensor 38 shown in FIG. 1, and differential pressure increases in the direction of the vertical axis arrow. The horizontal axis represents time and time increases from the left side of the plot to the right side of the plot. Differential GPF pressure is zero when trace 408 is near the horizontal axis.

The fifth plot from the top of FIG. 4 is a plot of exhaust sensor degradation state versus time. The vertical axis represents exhaust sensor degradation state and exhaust sensor degradation is indicated when trace 410 is at a higher level near the vertical axis arrow. Exhaust sensor degradation is not indicated when trace 410 is at a lower level near the horizontal axis. The horizontal axis represents time and time increases from the left side of the plot to the right side of the plot.

At time T0, the engine is on and running (e.g., combusting air and fuel), the exhaust sensor diagnostic is not requested and the exhaust valve is open. In addition, the differential pressure across the GPF is at a lower level and exhaust sensor degradation is not indicated.

At time T1, the engine stops and the differential pressure across the GPF begins to decline. The exhaust sensor diagnostic is not requested and the exhaust valve remains open. Exhaust sensor degradation is not indicated.

At time T2, an exhaust sensor diagnostic is requested as indicated by trace 402 transitioning to a higher level. The exhaust sensor diagnostic may be requested after a threshold amount of time or distance driven by the vehicle has been exceeded. Further, the exhaust sensor diagnostic while the engine is stopped may be requested when the exhaust sensor diagnostic has not been performed while the engine has been operating for a threshold amount of time. For example, if the exhaust valve has not opened and closed within a threshold amount of time, the exhaust sensor diagnostic may be performed when the engine is not operating. The exhaust valve remains in an open state and the engine remains off. The differential pressure across the GPF is zero and exhaust sensor degradation is not indicated.

Between time T2 and time T3, the vehicle operating conditions do not change and the exhaust sensor diagnostic does not begin. The exhaust sensor diagnostic may be delayed after an engine stop so that vehicle occupants may leave the area so that they may not be disturbed by the diagnostic.

At time T3, the exhaust sensor diagnostic begins and the engine is rotated in a reverse direction. The engine may be rotated via starter 96 or DISG 240. The engine is rotated without supplying fuel to the engine. The exhaust valve is closed and the exhaust sensor diagnostic state remains asserted. By closing the exhaust valve, the resistance between atmospheric pressure and a downstream side of the GPF 71 may be increased if the downstream hose is coupled to the exhaust system and the exhaust sensor 38 so that the differential pressure across the GPF is low. However, if the downstream hose is not coupled to the exhaust system and the exhaust sensor, a low flow resistance path exists to the inlet of the GPF such that pressure drop at the upstream side 38A of the exhaust pressure sensor may be more significant. The differential pressure across the GPF begins to increase as air flow through the engine increases due to engine rotation. The exhaust sensor is not indicated degraded. Additionally, the engine intake throttle is opened (not shown).

Between time T3 and time T4, the differential pressure increases to a higher level and then stabilizes. The pressure differential is sampled via controller 12 near time T3 after the pressure differential has stabilized and the sampled value is stored to memory. The exhaust sensor diagnostic state remains asserted and the exhaust valve remains closed. The engine continues to rotate in a reverse direction and exhaust sensor degradation is not indicated.

At time T4, the exhaust valve is opened and the engine continues to rotate in the reverse direction. By opening the exhaust valve, the resistance between atmospheric pressure and a downstream side of the GPF 71 may be decreased. If downstream hose 38D is connected to exhaust sensor 38 and exhaust system 39 a larger differential pressure may be observed by exhaust sensor 38. Likewise, if downstream hose 38D is disconnected from exhaust system 39 or exhaust sensor 38, the differential pressure observed by exhaust sensor 38 may be larger because atmospheric pressure is available at the downstream side of the GPF, which may increase the pressure drop across the GPF. Exhaust sensor degradation is not indicated.

Between time T4 and time T5, the differential pressure decreases only a small amount and then stabilizes. The pressure differential is sampled via controller 12 near time T5 after the pressure differential has stabilized and the sampled value is stored to memory. The differential pressure sampled just before time T4 is compared to the differential pressure sampled just before time T5. The exhaust sensor diagnostic state remains asserted and the exhaust valve remains closed. The engine continues to rotate in a reverse direction and exhaust sensor degradation is not indicated.

At time T5, controller 12 determines that the differential pressure change between shortly before time T4 and shortly before time T5 is less than a threshold change. As a result, it is judged that exhaust sensor degradation has occurred and exhaust sensor degradation is asserted. However, if the differential pressure had changed by more than the threshold amount, it would indicate that a pressure change due to flow the GPF, which may be expected when flow through the engine and exhaust is high and the downstream hose is connected between the exhaust sensor 38 and the exhaust system 39. Engine rotation is stopped and the differential pressure begins to decline. The engine throttle is also closed (not shown). Shortly after time T5, the exhaust sensor diagnostic is withdrawn, but the exhaust sensor degradation state remains asserted.

Figure 5A:
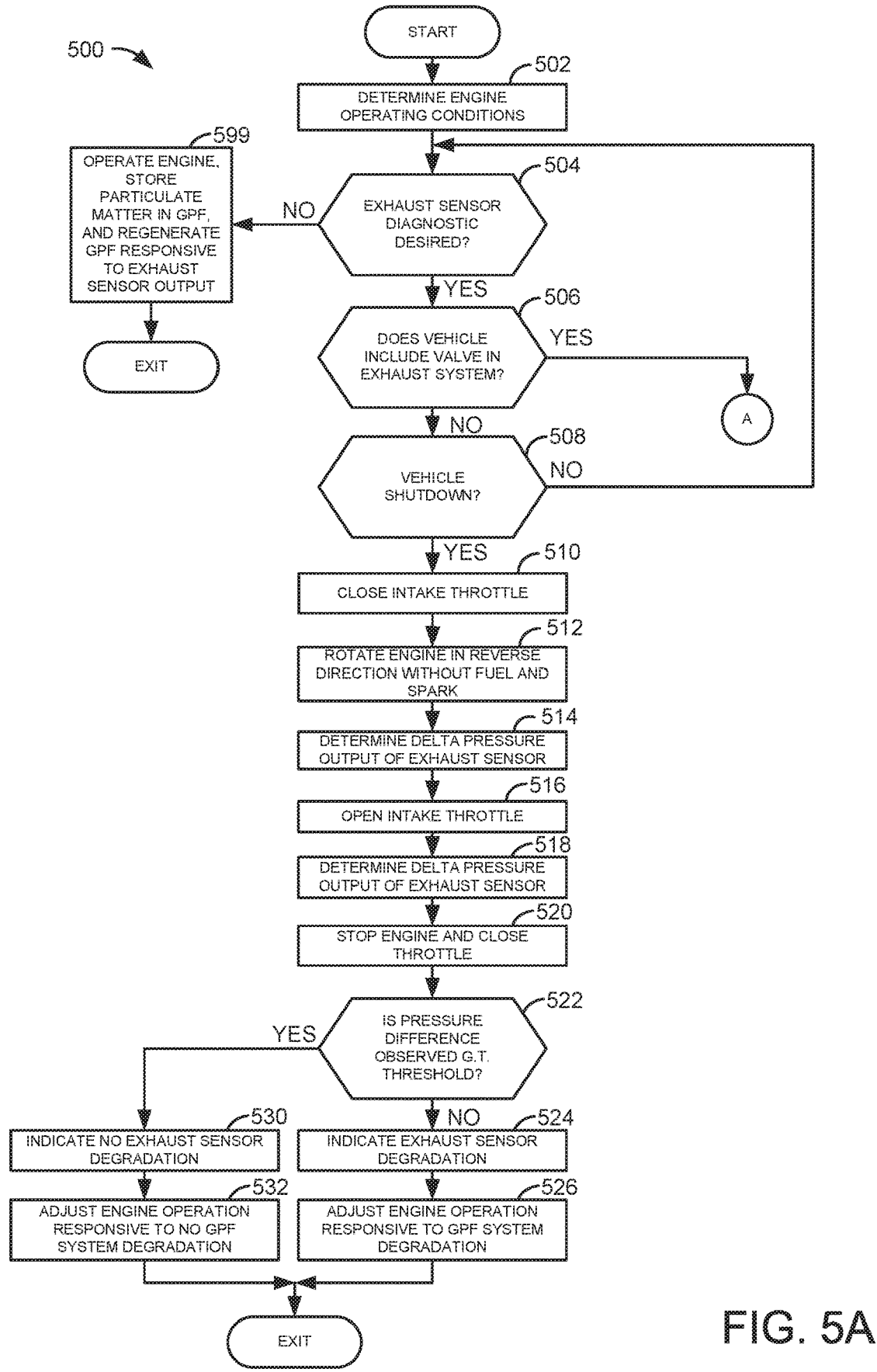
FIGS. 5A-5C show an example method for diagnosing an exhaust system sensor.
Figure 5B:
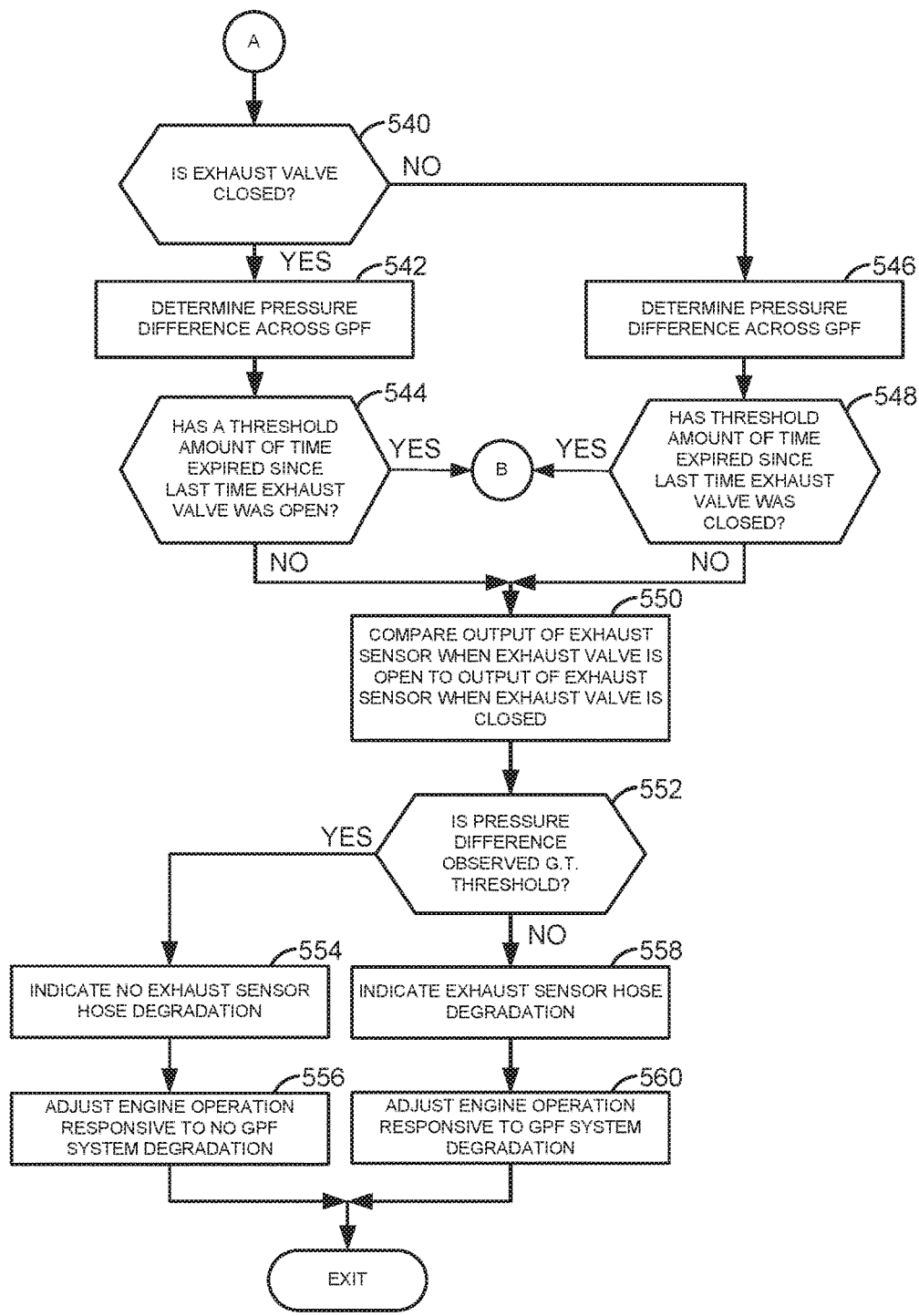
Figure 5C:
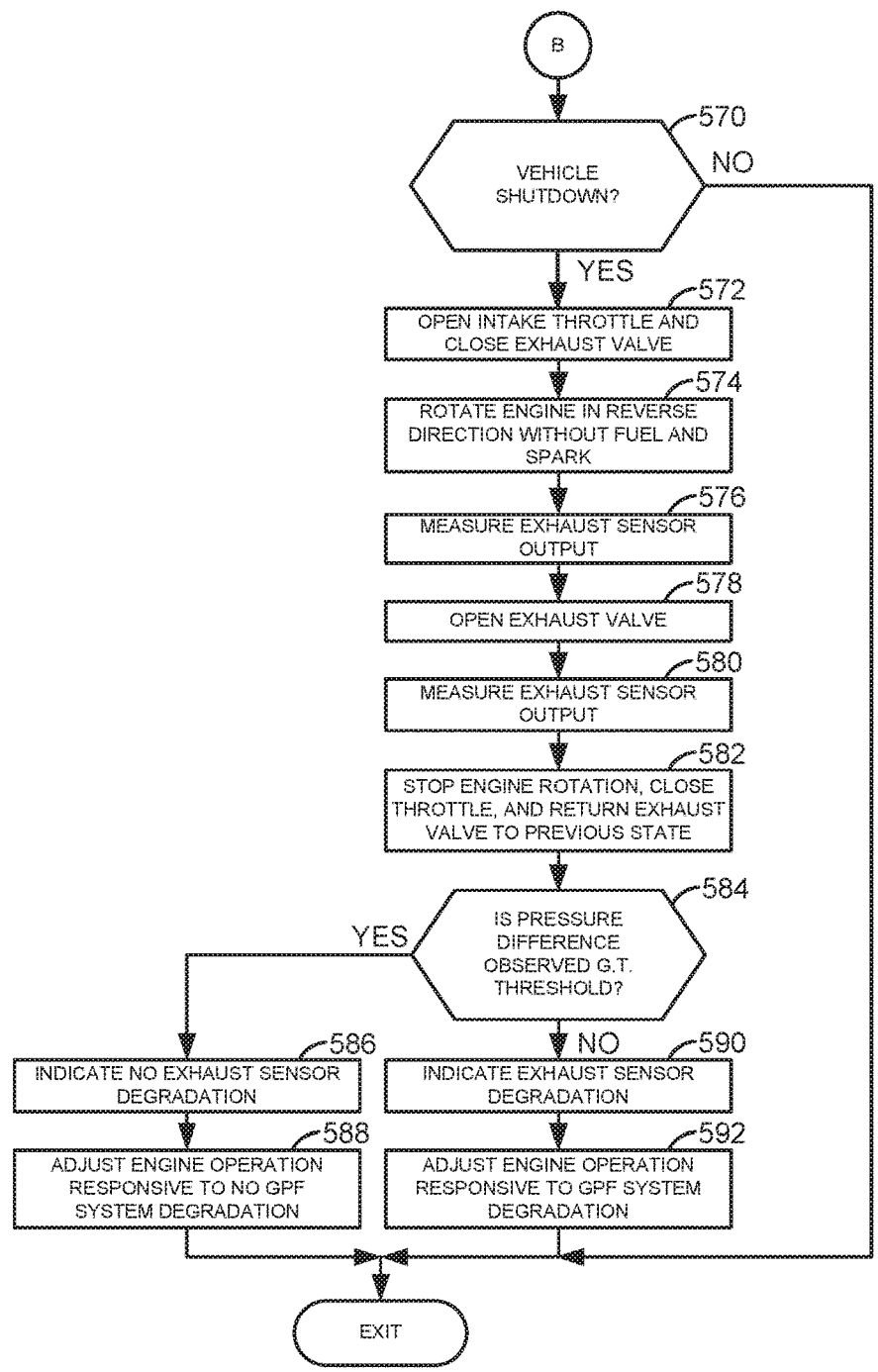

Referring now to FIGS. 5A-5C, a method for operating a vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 4.

At 502, method 500 determines vehicle operating conditions. Vehicle operating conditions may be determined via receiving inputs as shown in FIGS. 1 and 2 into controller 12. Vehicle operating conditions may include but are not limited to vehicle speed, engine speed, engine torque, driver demand torque, driveline disconnect clutch operating state, miles traveled by the vehicle, transmission operating state, driveline disconnect clutch application pressure, DISG speed, DISG torque, and ambient temperature. Method 500 proceeds to 504 after vehicle operating conditions are determined.

At 504, method 500 judges if an exhaust sensor diagnostic is desired. An exhaust sensor diagnostic may be desired at predetermined intervals, such as after a vehicle is driven a predetermined distance or after a predetermined amount of time. Further, in some examples, an exhaust sensor diagnostic may be requested in response to output of the exhaust sensor. If method 500 judges that an exhaust sensor diagnostic is desired, the answer is yes and method 700 proceeds to 506. Otherwise, the answer is no and method 500 proceeds to 599.

At 599, method 500 operates the engine combusting air and fuel while rotating the engine in a clock-wise direction. Method 500 also store particulate matter from the engine in a GPF and regenerates the GPF from time to time in response to output of the exhaust sensor (e.g., sensor 38 in FIG. 1). Method 500 proceeds to exit.

At 506, method 500 judges if the vehicle includes an exhaust valve (e.g., exhaust valve 73 shown in FIG. 1). Method 500 may include a variable stored in memory that indicates whether or not the vehicle includes an exhaust valve. The exhaust valve may be included to provide the vehicle with a performance sound when the exhaust valve is open and a subdued sound when the exhaust valve is closed. If method 500 judges that the vehicle includes an exhaust valve, the answer is yes and method 500 proceeds to 540. Otherwise, the answer is no and method 500 proceeds to 508.

At 508, method may judge whether or not the vehicle is shutdown. The vehicle may be determined to be shut down when a vehicle transponder is a predetermined distance away from the vehicle or when an ignition key is removed from the vehicle. The engine is stopped and the vehicle is not moving when the vehicle is shutdown. If method 500 judges that the vehicle is shutdown, method 500 proceeds to 510. Otherwise, method 500 returns to 504. In some examples, method 500 may also require that the vehicle be shutdown for a predetermined amount of time before proceeding to 510. Further, method 500 may further require that vehicle occupants have exited the vehicle before method 500 may proceed to 510.

At 510, method 500 closes the engine intake throttle. The intake throttle may be closed while the engine rotates to reduce flow through the engine so that only a small pressure drop across the GPF may be observed by the exhaust sensor event though the engine may be rotating. Method 500 proceeds to 512.

At 512, method 500 begins to rotate the engine in a reverse direction. By rotating the engine in a reverse direction the amount of air pumped through the engine may be increased. Further, an amount of energy to rotate the engine may be reduced. The engine may be rotated in reverse via a starter (e.g., 96 of FIG. 1) or a DISG (e.g., 240 of FIG. 2). Fuel is not supplied to the engine while it is rotated in a reverse direction. Method 500 proceeds to 514.

At 514, method 500 measures output of the exhaust sensor (e.g., 38 of FIG. 1) and stores the measure output to controller memory. Method 500 may wait a predetermined amount of time before measuring output of the exhaust sensor so that operating conditions stabilize. Because the engine intake throttle is closed, the differential pressure measured by the exhaust sensor should be low whether or not the exhaust sensor hoses are coupled to the exhaust system as they are expected to be. Method 500 proceeds to 516 after sampling output of the exhaust pressure sensor.

At 516, method 500 opens the engine intake throttle. By opening the engine intake throttle, air flow through the engine and GPF should increase, thereby causing an increase in differential pressure across the GPF if the exhaust sensor is properly coupled to the exhaust system. If a downstream hose (e.g., 38D in FIG. 1) is disconnected, the differential pressure increase may be low since the downstream side of the differential pressure sensor is exposed to atmospheric pressure and since the upstream side of the differential pressure sensor may be near closer to atmospheric pressure. Method 500 proceeds to 518.

At 518, method 500 measures output of the exhaust sensor (e.g., 38 of FIG. 1) and stores the measure output to controller memory. Method 500 may wait a predetermined amount of time before measuring output of the exhaust sensor so that operating conditions stabilize. Because the engine intake throttle is open, the differential pressure measured by the exhaust sensor should be high unless the downstream hose of the exhaust sensor is uncoupled from the exhaust system. If the downstream hose is disconnected from the exhaust system, the differential pressure observed via the exhaust pressure sensor should be lower than if the downstream hose were connected to the exhaust system under the same conditions. Method 500 proceeds to 520.

At 520, method 500 stops engine rotation and closes the engine intake throttle. By ceasing engine rotation, less current may be drawn from the vehicle battery. Method 500 proceeds to 522.

At 522, method 500 judges if a magnitude of a pressure difference between a pressure differential output by the exhaust sensor while the engine throttle was closed minus the pressure differential output by the exhaust sensor after the engine throttle was opened is greater than a threshold pressure difference. If so, the answer is yes and method 500 proceeds to 530. If not, the answer is no and method 500 proceeds to 524.

At 530, method 500 indicates no exhaust sensor degradation. Method 500 may not assert exhaust sensor degradation when differential pressures are determined to be at desired levels during the diagnostic. Method 500 proceeds 532.

At 532, method 500 adjusts engine operating thresholds such that full engine power and speeds are available. Method 500 proceeds to exit.

At 524, method 500 indicates exhaust sensor degradation. Method 500 may indicate exhaust sensor degradation via illuminating a light, changing a value of a variable in controller memory, or by providing a visual indication through a human/machine interface. Method 500 proceeds 526.

At 526, method 500 adjusts engine operating thresholds such that reduced engine power and speeds may be available. For example, method 500 may reduce an engine power limit such that the engine may output 70% of full engine power when exhaust sensor degradation is present. In other examples, engine power may not be limited, but particulate filter regeneration may be provided more frequently. For example, the vehicle's particulate filter may be regenerated via increasing particulate filter temperature every 500 Km instead of every 1000 Km. By increasing the particulate filter regeneration frequency, the possibility of accumulating a large amount of carbonaceous matter in the particulate filter may be reduced. Method 500 proceeds to exit.

At 540, method 500 judges if the exhaust valve (e.g., 73 in FIG. 1) is in an open or closed state. In one example, a variable in controller memory indicates the state of the exhaust valve. If method 500 judges that the exhaust valve is closed, the answer is yes and method 500 proceeds to 542. Otherwise, the answer is no and method 500 proceeds to 546.

At 542, method 500 determines a differential pressure indicated by the exhaust pressure sensor. In one example, method 500 may determine the differential pressure via sampling output of the exhaust valve after the engine has operated at a predetermined engine speed and load for a predetermined amount of time. For example, method 500 may sample differential pressure sensor output when the engine has operated at 1600 RPM and 100 N-m of torque for at least 3 seconds. Method 500 proceeds to 544.

At 544, method 500 judges if a threshold amount of time has expired since a last time the exhaust valve was open and the exhaust sensor was sampled for differential pressure. For example, if the threshold amount of time is twenty minutes and it has been two hours since the exhaust valve was open and the exhaust sensor differential pressure output was sampled while the engine operated at the predetermined engine speed and load described at 542, it may be determined that the answer is yes and method 500 proceeds to 570. However, if the exhaust valve was open and the exhaust sensor was sampled while the engine operated at the predetermined engine speed and load described at 542 less than twenty minutes before the exhaust sensor was sampled while the engine operated at the predetermined speed and load mentioned at 542, the answer is no and method 500 proceeds to 550. If greater than a threshold amount of time has transpired since the last time the exhaust valve was open and the exhaust sensor was sampled at the predetermined speed and load described at 546, the answer is yes and method 500 proceeds to 570. Otherwise, the answer is no and method 500 proceeds to 550.

Thus, step 544 may require that the exhaust valve open and close to verify operation of the exhaust sensor within a threshold amount of time. Such a check may be useful when the exhaust valve is manually controlled. Further, it may be desirable to not permit automatic adjustment of exhaust valve position when an exhaust sensor diagnostic is requested so that vehicle occupants may not be disturbed via an intrusive monitor.

At 546, method 500 determines a differential pressure indicated by the exhaust pressure sensor. In one example, method 500 may determine the differential pressure via sampling output of the exhaust valve after the engine has operated at a predetermined engine speed and load for a predetermined amount of time. For example, method 500 may sample differential pressure sensor output when the engine has operated at 1600 RPM and 100 N-m of torque for at least 3 seconds. Method 500 proceeds to 548.

At 548, method 500 judges if a threshold amount of time has expired since a last time the exhaust valve was closed and the exhaust sensor was sampled for differential pressure. For example, if the threshold amount of time is twenty minutes and it has been two hours since the exhaust valve was closed and the exhaust sensor differential pressure output was sampled while the engine operated at the predetermined engine speed and load described at 542, it may be determined that the answer is yes and method 500 proceeds to 570. However, if the exhaust valve was closed and the exhaust sensor was sampled while the engine operated at the predetermined engine speed and load described at 542 less than twenty minutes before the exhaust sensor was sampled while the engine operated at the predetermined speed and load mentioned at 542, the answer is no and method 500 proceeds to 550. If greater than a threshold amount of time has transpired since the last time the exhaust valve was closed and the exhaust sensor was sampled at the predetermined speed and load described at 546, the answer is yes and method 500 proceeds to 570. Otherwise, the answer is no and method 500 proceeds to 550.

Thus, step 548 may require that the exhaust valve open and close to verify operation of the exhaust sensor within a threshold amount of time. Such a check may be useful when the exhaust valve is manually controlled.

At 550, method 500 determines a difference in the output of the exhaust sensor while the exhaust is open and the engine operated at the predetermined speed and load to output of the exhaust sensor while the exhaust valve is closed and the engine operated at the predetermined speed and load. Method 500 proceeds to 552.

At 552, method 500 judges if a magnitude of a pressure difference between a pressure differential output by the exhaust sensor while the exhaust valve was closed minus the pressure differential output by the exhaust sensor while the exhaust valve was open is greater than a threshold pressure difference. If so, the answer is yes and method 500 proceeds to 554. If not, the answer is no and method 500 proceeds to 558.

At 554, method 500 indicates no exhaust sensor degradation. Method 500 may not assert exhaust sensor degradation when differential pressures are determined to be at desired levels during the diagnostic. Method 500 proceeds to 556.

At 556, method 500 adjusts engine operating thresholds such that full engine power and speeds are available. Method 500 proceeds to exit.

At 558, method 500 indicates exhaust sensor degradation. Method 500 may indicate exhaust sensor degradation via illuminating a light, changing a value of a variable in controller memory, or by providing a visual indication through a human/machine interface. Method 500 proceeds to 560.

At 560, method 500 adjusts engine operating thresholds such that reduced engine power and speeds may be available. For example, method 500 may reduce an engine power limit such that the engine may output 70% of full engine power when exhaust sensor degradation is present. In other examples, engine power may not be limited, but particulate filter regeneration may be provided more frequently. For example, the vehicle's particulate filter may be regenerated via increasing particulate filter temperature every 500 Km instead of every 1000 Km. By increasing the particulate filter regeneration frequency, the possibility of accumulating a large amount of carbonaceous matter in the particulate filter may be reduced. Method 500 proceeds to exit.

At 570, method 500 judges whether or not the vehicle is shutdown. The vehicle may be considered to be shutdown when the vehicle's engine is stopped, the vehicle is stopped, and a key or other device is out of a predetermined range of the vehicle. Further, the vehicle may be considered shutdown when there are no longer occupants in the vehicle. In addition, in some examples, method 500 may require that a predetermined amount of time has elapsed since the vehicle was shutdown before method 500 proceeds to 572. If method 500 judges that the vehicle is shutdown, method 500 proceeds to 572. Otherwise, method 500 exits.

In this way, method 500 may attempt to diagnose exhaust sensor operation when the vehicle is operational, but if the exhaust valve isn't timely opened and closed with the engine operating at a desired engine speed and load, the exhaust sensor diagnostic may be delayed until the vehicle is shutdown.

At 572, method 500 opens the engine intake throttle and closes the exhaust valve. The intake throttle may be opened while the engine rotates and the exhaust valve is closed because the muffler may reduce flow through the engine and the GPF so that a small pressure drop may occur across the GPF. Method 500 proceeds to 574.

At 574, method 500 begins to rotate the engine in a reverse direction. By rotating the engine in a reverse direction the amount of air pumped through the engine may be increased. Further, an amount of energy to rotate the engine may be reduced. The engine may be rotated in reverse via a starter (e.g., 96 of FIG. 1) or a DISG (e.g., 240 of FIG. 2). Fuel is not supplied to the engine while it is rotated in a reverse direction. Method 500 proceeds to 576.

At 576, method 500 measures output of the exhaust sensor (e.g., 38 of FIG. 1) and stores the measure output to controller memory. Method 500 may wait a predetermined amount of time before measuring output of the exhaust sensor so that operating conditions stabilize. Because the engine intake throttle is closed, the differential pressure measured by the exhaust sensor should be low whether or not the exhaust sensor hoses are coupled to the exhaust system as they are expected to be. Method 500 proceeds to 578 after sampling output of the exhaust pressure sensor.

At 578, method 500 opens the exhaust valve. By opening the exhaust valve, air flow through the engine and GPF should increase due to no resistance via the muffler, thereby causing an increase in differential pressure across the GPF if the exhaust sensor is properly coupled to the exhaust system. If a downstream hose (e.g., 38D in FIG. 1) is disconnected, the differential pressure increase may be low since the downstream side of the differential pressure sensor is exposed to atmospheric pressure and since the upstream side of the differential pressure sensor may be near closer to atmospheric pressure. Method 500 proceeds to 580.

At 580, method 500 measures output of the exhaust sensor (e.g., 38 of FIG. 1) and stores the measure output to controller memory. Method 500 may wait a predetermined amount of time before measuring output of the exhaust sensor so that operating conditions stabilize. Because the engine intake throttle is open, the differential pressure measured by the exhaust sensor should be high unless the downstream hose of the exhaust sensor is uncoupled from the exhaust system. If the downstream hose is disconnected from the exhaust system, the differential pressure observed via the exhaust pressure sensor should be lower than if the downstream hose were connected to the exhaust system under the same conditions. Method 500 proceeds to 582.

At 582, method 500 stops engine rotation and closes the engine intake throttle. Method 500 also returns the exhaust valve to the state it occupied when the vehicle was initially shutdown. By ceasing engine rotation, less current may be drawn from the vehicle battery. Method 500 proceeds to 584.

At 584, method 500 judges if a magnitude of a pressure difference between a pressure differential output by the exhaust sensor while the exhaust valve was closed minus the pressure differential output by the exhaust sensor after the exhaust valve was opened is greater than a threshold pressure difference. If so, the answer is yes and method 500 proceeds to 586. If not, the answer is no and method 500 proceeds to 590.

At 586, method 500 indicates no exhaust sensor degradation. Method 500 may not assert exhaust sensor degradation when differential pressures are determined to be at desired levels during the diagnostic. Method 500 proceeds 588.

At 588, method 500 adjusts engine operating thresholds such that full engine power and speeds are available. Method 500 proceeds to exit.

At 590, method 500 indicates exhaust sensor degradation. Method 500 may indicate exhaust sensor degradation via illuminating a light, changing a value of a variable in controller memory, or by providing a visual indication through a human/machine interface. Method 500 proceeds 592.

At 592, method 500 adjusts engine operating thresholds such that reduced engine power and speeds may be available. For example, method 500 may reduce an engine power limit such that the engine may output 70% of full engine power when exhaust sensor degradation is present. In other examples, engine power may not be limited, but particulate filter regeneration may be provided more frequently. For example, the vehicle's particulate filter may be regenerated via increasing particulate filter temperature every 500 Km instead of every 1000 Km. By increasing the particulate filter regeneration frequency, the possibility of accumulating a large amount of carbonaceous matter in the particulate filter may be reduced. Method 500 proceeds to exit.

Thus, method 500 provides for a vehicle operating method, comprising: in response to an exhaust system sensor diagnostic request, rotating an engine in a reverse direction without fueling the engine; receiving data from a differential pressure sensor to a controller while rotating the engine in the reverse direction; and adjusting engine operation via the controller in response to the data from the differential pressure sensor. The method includes where adjusting engine operation includes regenerating a particulate filter. The method includes where adjusting engine operation includes limiting engine power output. The method further comprises closing an engine intake throttle valve while rotating the engine in the reverse direction. The method further comprises opening an engine intake throttle valve while rotating the engine in the reverse direction. The method further comprises opening an engine intake throttle valve and closing an exhaust valve while rotating the engine in the reverse direction. The method further comprises opening an engine intake throttle valve and opening an exhaust valve while rotating the engine in the reverse direction. The method includes where adjusting engine operation via the controller in response to the data from the differential pressure sensor includes adjusting engine operation when the data from the differential pressure sensor indicates a pressure change between a first condition when an exhaust valve is open and a second condition when the exhaust valve is closed is less than a threshold. The method includes where adjusting engine operation via the controller in response to the data from the differential pressure sensor includes not adjusting engine operation when the data from the differential pressure sensor indicates the pressure change between the first condition when the exhaust valve is open and the second condition when the exhaust valve is closed is greater than a threshold.

Method 500 also provides for a vehicle operating method, comprising: in response to an exhaust system sensor diagnostic request, measuring a pressure drop across a particulate filter located downstream of an engine while combusting air and fuel in the engine when an exhaust valve is open and when the exhaust valve is closed; and measuring the pressure drop across the particulate filter while not combusting air and fuel in the engine and rotating the engine in a reverse direction in response to the sensor diagnostic request and the exhaust valve not changing state for a threshold amount of time while the engine is combusting air and fuel.

The method further comprises comparing a pressure drop across the particulate filter when the exhaust valve is closed to a pressure drop across the particulate filter when the exhaust valve is open. The method further comprises adjusting operation of an engine in response to comparing the pressure drop across the particulate filter when the exhaust valve is closed to the pressure drop across the particulate filter when the exhaust valve is open.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   in response to an exhaust system sensor diagnostic request, rotating an engine in a reverse direction without fueling the engine;
   receiving data from a differential pressure sensor to a controller while rotating the engine in the reverse direction; and
   adjusting engine operation via the controller in response to the data from the differential pressure sensor.

2. The method of claim 1, where adjusting engine operation includes regenerating a particulate filter, and wherein the reverse rotation direction is initiated from the engine being stopped and not rotating.

3. The method of claim 1, where adjusting engine operation includes limiting engine power output, and wherein the engine has intake and exhaust valve timings which provide higher flow through the engine when the engine is rotated in the reverse direction as compared to forward for a given engine speed.

4. The method of claim 1, further comprising closing an engine intake throttle valve while rotating the engine in the reverse direction, and wherein an engine exhaust valve opening duration is longer than an engine intake valve opening duration for an engine combustion cycle.

5. The method of claim 1, further comprising opening an engine intake throttle valve while rotating the engine in the reverse direction.

6. The method of claim 1, further comprising opening an engine intake throttle valve and closing an exhaust valve while rotating the engine in the reverse direction.

7. The method of claim 1, further comprising opening an engine intake throttle valve and opening an exhaust valve while rotating the engine in the reverse direction.

8. The method of claim 1, where adjusting engine operation via the controller in response to the data from the differential pressure sensor includes adjusting engine operation when the data from the differential pressure sensor indicates a pressure change between a first condition when an exhaust valve is open and a second condition when the exhaust valve is closed being less than a threshold.

9. The method of claim 8, where adjusting engine operation via the controller in response to the data from the differential pressure sensor includes not adjusting engine operation when the data from the differential pressure sensor indicates the pressure change between the first condition when the exhaust valve is open and the second condition when the exhaust valve is closed being greater than the threshold.

10. A vehicle operating method, comprising:
    in response to an exhaust system sensor diagnostic request, measuring a pressure drop across a particulate filter located downstream of an engine while combusting air and fuel in the engine when an exhaust valve is open and when the exhaust valve is closed; and
    measuring the pressure drop across the particulate filter while not combusting air and fuel in the engine with the engine stopped and not rotating, and then rotating the engine in a reverse direction in response to the sensor diagnostic request and the exhaust valve not changing state for a threshold amount of time while the engine is combusting air and fuel.

11. The method of claim 10, further comprising comparing the pressure drop across the particulate filter when the exhaust valve is closed to the pressure drop across the particulate filter when the exhaust valve is open.

12. The method of claim 11, further comprising adjusting operation of the engine in response to comparing the pressure drop across the particulate filter when the exhaust valve is closed to the pressure drop across the particulate filter when the exhaust valve is open.

13. A system, comprising:
    a vehicle including an engine;
    a motor selectively coupled to the engine with intake and exhaust valve timings that generate increased flow in a reverse rotation direction as compared with a forward direction at a given engine speed; and
    a controller including executable instructions stored in non-transitory memory to rotate the engine in the reverse rotation direction via the motor without combusting air and fuel in response to an exhaust sensor diagnostic request, and instructions to propel the vehicle via the motor.

14. The system of claim 13, further comprising additional instructions to combust air and fuel in the engine and to rotate the engine in the forward direction.

15. The system of claim 13, further comprising a particulate filter and an exhaust valve located in an exhaust system coupled to the engine, the exhaust valve located downstream of the particulate filter.

16. The system of claim 15, further comprising additional instructions to open and close the exhaust valve while rotating the engine in the reverse rotation direction.

17. The system of claim 15, further comprising a differential pressure sensor configured to sense pressure on two opposite sides of the particulate filter.

18. The system of claim 17, further comprising additional instructions to compare output of the differential pressure sensor when the exhaust valve is open to output of the differential pressure sensor when the exhaust valve is closed.

19. The system of claim 18, further comprising additional instructions to adjust operation of the engine in response to the comparison.

20. The system of claim 13, where the motor is an integrated starter/generator.

* * * * *